May 31, 1932.   R. S. A. DOUGHERTY ET AL   1,860,834
ENGINE
Filed July 12, 1929    2 Sheets-Sheet 1

Inventors
R.S.A. Dougherty
and Nevil Greenwell.
By R.S.A. Dougherty.
Attorney

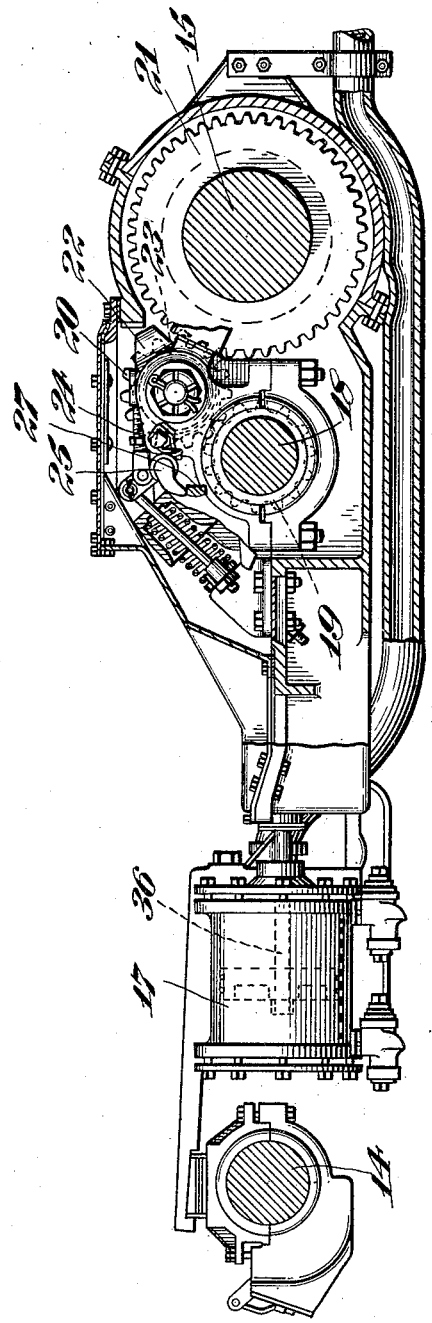

Patented May 31, 1932

1,860,834

UNITED STATES PATENT OFFICE

ROBERT S. A. DOUGHERTY AND NEVIL GREENWELL, OF BETHLEHEM, PENNSYLVANIA, ASSIGNORS TO BETHLEHEM STEEL COMPANY, A CORPORATION OF PENNSYLVANIA

ENGINE

Application filed July 12, 1929. Serial No. 377,820.

Our invention relates to controlling means for engines and especially to controlling means for engines used as auxiliary propulsion units.

In connection with steam engines used as auxiliary propulsion units for vehicles in which a train of gears is employed through which an axle of the vehicle is driven, and particularly of the type which has a driving gear mounted on the crankshaft of the engine and an idler gear constantly meshing with the driving gear which is capable of being entrained with a driven gear on the axle of the vehicle due to the turning over of the engine and which is maintained in engagement with said gear solely by the resultant of the working forces set up between the teeth of these gears and which is disentrained from the driven gear when the speed of the engine is insufficient to create the necessary working forces between the teeth of the idler gear and the driven gear, it has heretofore been the practice where superheated steam is used for operating the auxiliary propulsion unit to supply this steam from a source intermediate the main throttle and the cylinders of the main locomotive. In consequence thereof each time the main throttle is closed the gears would be disentrained, and in certain cases (especially in hump service where it is necessary for the engineer to successively open and close the main throttle to overcome slippage of the wheels of the main locomotive, the gears were disentrained and entrained each time the main throttle was closed and opened respectively. This caused excessive wear to the auxiliary engine and especially to the gear mechanism.

It is therefore the object of our invention to provide means for supplying steam from an auxiliary source to the auxiliary propulsion unit so that the gears will be maintained in entrainment continuously while the auxiliary throttle is open regardless of whether the main throttle is open or closed.

The novel features of our invention will be more fully understood from the following description and claims taken with the drawings in which:—

Fig. 2 is a view of an auxiliary locomotive engine partially in cross section.

Figure 1:
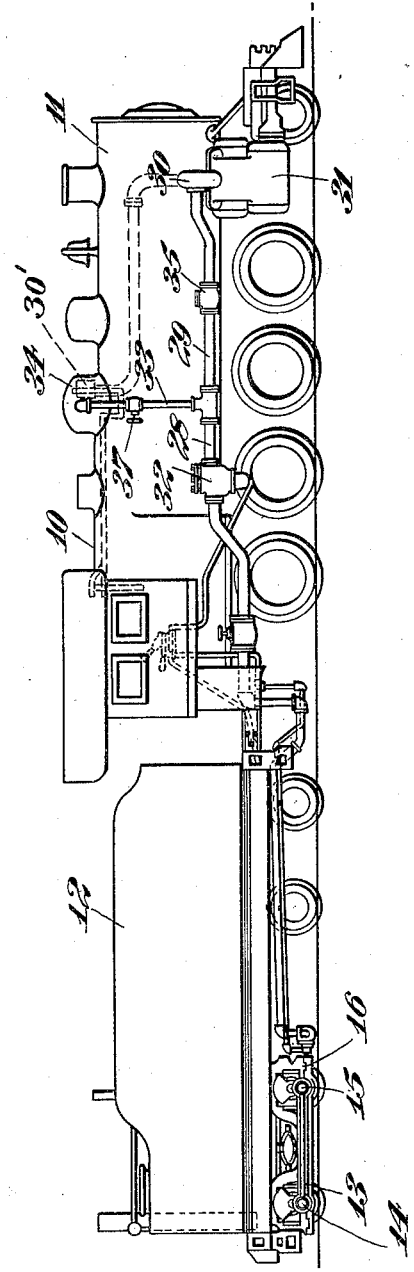
Fig. 1 illustrates diagrammatically a steam locomotive embodying our invention.

Referring to the drawings more in detail, 10 designates a locomotive having a boiler 11 of usual construction for generating steam, and a tender 12 coupled thereto. An auxiliary engine 13 is suspended intermediate the axle 14 and 15 of the tender truck 16 and is adapted to be operatively connected to the axle 15 of said truck through suitable gearing when the auxiliary engine is turned over upon the admission of steam to its cylinders 17 and which is adapted to automatically disentrain when the steam supply is cut off from the cylinders 17.

Referring to Fig. 2 of the drawings, in which one type of auxiliary locomotive is shown in detail, 18 designates the crank shaft thereof which is provided with a driving gear 19. An idler gear 20 is constantly in mesh with the driving gear 19 and is maintained in this relation by the shifter bracket 22 which is capable of angular movement with respect to the axis of the driving gear so that the idler gear is capable of moving into and out of mesh with the driven gear 21 which is mounted on the axle 15. In order that the idler gear 20 may be positively moved towards the driven gear when the driving gear is rotated, a friction band 23 is provided to retard the rotation of the idler gear about its axis. One end of the friction band 23 is connected to the bracket 22 and the other end through suitable levers to the shaft 24 which is rotatively mounted in the bracket 22. A cam 25 is provided on the shaft 24 and is adapted to engage the cam plate 27 as the gear 20 commences to mesh with gear 21 and thus rotates the shaft 24 and releases the band 23 and therefore allows the idler gear 20 to rotate freely about its axis so as to drive the gear 21.

Pipes 28 and 29 are provided for conveying steam to the auxiliary engine 13. The pipe 29 is connected to the superheated steam pipe 30 intermediate the main throttle valve 30′ and the cylinders 31 of the main locomotive. A throttle valve 32, which is operated by means located in the engineer cab, is disposed in the pipe line 28 for controlling the steam supply to the cylinders 17.

As the superheated steam which is supplied through pipes 28 and 29 to the auxiliary engine 13 is received from the pipe 30 intermediate the main throttle valve 30' and the main engine cylinders 31, the closing of the main throttle cuts off the supply of superheated steam to the auxiliary engine 13. In certain cases, especially in hump service where it is necessary for the engineer to successively open and close the main throttle to overcome the slippage of wheels of the main locomotive, it is desirable to supply steam to the auxiliary engine, when the auxiliary throttle valve is open, even when the main throttle is closed, in order to maintain steam pressure in the auxiliary engine cylinders so as to maintain the gears in entrainment. To this end we have provided a pipe 33 leading from the dome 34 which is adapted to supply sufficient saturated steam to operate the auxiliary engine 13 and thus prevent the disentrainment of the gearing when the main throttle is closed and the auxiliary throttle is open. In order to prevent the saturated steam passing through the pipe 29 to the main locomotive cylinders 31, we provide a check valve 35 which is so arranged that it will automatically close when the main throttle is closed and will automatically open upon the opening of the main throttle.

In operation, the auxiliary locomotive being in its inoperative condition, due to the auxiliary throttle valve 32 being in its closed position, and the main throttle valve being open and supplying steam to the pipe 28, the engineer, in order to put the auxiliary locomotive into operation, opens the throttle valve 32. The opening of the throttle valve 32 permits superheated steam from the pipe 30 to be supplied to the auxiliary locomotive cylinders 17 through the pipes 28 and 29. The admission of fluid to the cylinders 17 will cause the pistons 36 to reciprocate and thus rotate the crankshaft 18 and the driving gear 19 which is operatively connected thereto, which in turn tends to drive the idler gear 20 which is rotatively mounted in the bracket 22. As the idler gear 20, in the construction shown in the drawings, is held against rotation by the friction band 23, the bracket 22 is caused to rotate about the axis of the driving gear 19 until the idler gear 20 commences to mesh with the gear 21 which is keyed to the axle 15. As soon as the gear 20 commences to mesh with the gear 21 the cam 25 engages the cam plate 27 and causes the friction band 23 to be released from the idler gear 20 and thus allows the idler gear to rotate about its axis and drive the gear 21.

The auxiliary locomotive is now in driving relation with the axle 15 of the tender 12 and will remain in this relation as long as sufficient steam is supplied to the cylinders 17 to cause the engine unit to transmit power to the driven gear 21.

In cases where it becomes necessary for the engineer to successively open and close the main throttle valve, the normal supply of superheated steam to the auxiliary locomotive through the pipes 28 and 29 will also be cut off when the main throttle is closed. However, sufficient saturated steam will be supplied to the auxiliary locomotive through the pipes 33 and 18 to operate the pistons 36 so as to maintain the gears in entrainment during the period the main throttle is closed, or until such time as the auxiliary throttle 32 is closed. The check valve 35 prevents the saturated steam from flowing to the cylinders 31 of the main locomotive when the main throttle is closed.

A stop valve 37 is provided in the branch pipe 33 to enable the engineer to close off the saturated steam supply entirely when he desires so to do.

While we have shown our invention in but one form, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

Having thus described our invention what we claim as new and desire to secure by Letters Patent is:

1. A fluid pressure supply system for an auxiliary engine, comprising a main fluid supply conduit, a main throttle for said conduit, an auxiliary throttle for said conduit, and an auxiliary fluid supply conduit connected to said main fluid conduit intermediate said throttles whereby pressure fluid may be supplied simultaneously from a plurality of sources to the engine under the control of said auxiliary throttle.

2. In combination with a main locomotive and its throttle, an auxiliary locomotive and its throttle, means for supplying motive fluid to the auxiliary locomotive from one source depending upon the opening of the main throttle and the auxiliary throttle, and means for supplying pressure fluid from an auxiliary source at the same time to the auxiliary locomotive independently of the main throttle, but, dependently of the auxiliary throttle.

3. In combination with a main locomotive and its throttle, of an auxiliary locomotive and its throttle, an axle, means to connect or disconnect said auxiliary locomotive to or from said axle actuated by the operation of said auxiliary locomotive, means controlled by both of said throttles adapted to supply superheated steam to the auxiliary locomotive, and means controlled by the auxiliary throttle adapted to supply saturated steam to the auxiliary locomotive at the same time superheated steam is being supplied thereto.

4. A fluid supply system for an engine comprising a fluid pressure generator, a main fluid supply conduit communicating said generator with the engine, an auxiliary fluid supply conduit communicating said generator with the engine at the same time, a main throttle for controlling fluid from said main conduit, and an auxiliary throttle for controlling the fluid from both of said conduits.

5. In combination with a main locomotive and its throttle, an auxiliary locomotive and its throttle, means adapted to supply steam to the auxiliary locomotive from a source controlled by the main throttle and means controlled by the auxiliary throttle adapted to supply steam at the same time from a source independently of the main throttle.

6. In combination with a main locomotive and its throttle of an auxiliary locomotive and its throttle, means for supplying steam to the auxiliary locomotive from a source intermediate the main locomotive throttle and its cylinders, when the auxiliary and the main locomotive throttles are open and means controlled by the auxiliary throttle adapted to supply steam to the auxiliary locomotive at the same time from an auxiliary source independently of the main throttle.

7. In combination with a main locomotive and its throttle of a normally idle auxiliary locomotive and its throttle, means for automatically entraining the auxiliary locomotive with an axle to be driven upon admission of steam to its cylinders, means controlled by the latter throttle adapted to supply steam from two sources to the auxiliary locomotive cylinder when the main locomotive and the auxiliary locomotive throttles are open and means controlled by the auxiliary locomotive throttle adapted to supply steam from one of said sources to the auxiliary locomotive upon the closing of the main throttle.

8. In combination with a main locomotive and its cylinders, an auxiliary locomotive, a main source and an auxiliary source of steam supply for the auxiliary locomotive, piping communicating with the main locomotive cylinders for conveying steam to the auxiliary locomotive and a check valve in said piping actuated by the auxiliary sources of steam supply to close communication to the main locomotive cylinders from the auxiliary source upon the discontinuance of the main source of steam supply.

9. In combination with a main locomotive and its throttle, an auxiliary locomotive and its throttle, means comprising piping for supplying steam to the auxiliary locomotive from a main source when the main locomotive throttle and the auxiliary throttle are open, means comprising piping for supplying steam from an auxiliary source, and an automatically operated valve actuated by steam from the latter source to close communication between the piping of the main source and the piping of the auxiliary locomotive upon the closing of the main throttle.

10. In combination with a main locomotive and its throttle, of a normally idle auxiliary locomotive and its throttle, said auxiliary locomotive being adapted to be entrained with an axle to be driven upon the admission of fluid to its cylinders, and adapted to be automatically disentrained upon the cutting off of the fluid supply to its cylinders, means adapted to supply fluid from a main source to the auxiliary locomotive cylinder when the main locomotive throttle and the auxiliary locomotive throttle are open and means controlled by the auxiliary throttle adapted to supply fluid from an auxiliary source at the same time thereby to retain the auxiliary locomotive in entrainment upon the closing of the main throttle.

11. In combination a main locomotive and its throttle, an axle, an auxiliary engine normally disengaged from said axle, a source of pressure fluid supply for the auxiliary engine controlled by the main locomotive throttle, a secondary source of pressure fluid supply for the auxiliary engine, and means for placing the auxiliary engine in driving relation with respect to said axle actuated by the operation of said engine when supplied with pressure fluid from either of said sources.

12. In combination a main locomotive, an axle, an auxiliary engine normally disengaged from said axle, means for placing the auxiliary engine in driving relation with respect to said axle actuated by the operation of said engine, and a plurality of sources of pressure fluid supply for supplying pressure fluid to operate said engine.

13. In combination a main locomotive, an axle, an auxiliary engine normally disengaged from said axle, means for placing the auxiliary engine in driving relation with respect to said axle actuated by the operation of said engine, a plurality of sources of pressure fluid supply for supplying pressure fluid to operate said engine, and means for controlling one of said sources independently of the other of said sources.

14. In combination a main locomotive, an axle, an auxiliary engine normally disengaged from said axle, means for placing the auxiliary engine in driving relation with respect to said axle actuated by the operation of said engine, a plurality of sources of pressure fluid supply for supplying pressure fluid to operate said engine, and a main throttle for the main locomotive controlling one of said sources.

15. In combination with a main locomotive and its throttle, of a normally idle auxiliary locomotive and its throttle, said auxiliary locomotive being adapted to be entrained with an axle, means for supplying pressure fluid from a main source to the auxiliary locomotive controlled by the main locomotive throttle and the auxiliary locomotive throttle, and means controlled by the auxiliary throttle to supply pressure fluid from an auxiliary source at the same time, thereby fluid pressure is maintained in the auxiliary engine upon the closing of the main throttle.

In testimony whereof we hereunto affix our signatures.

ROBERT S. A. DOUGHERTY.
NEVIL GREENWELL.